United States Patent [19]
Hepworth et al.

[11] 4,187,362
[45] Feb. 5, 1980

[54] SYNTHETIC RESINS DERIVED FROM PETROLEUM

[75] Inventors: Paul Hepworth; Ian S. Ripley, both of Middlesbrough, England

[73] Assignee: Imperial Chemical Industries Limited, London, England

[21] Appl. No.: 673,055

[22] Filed: Apr. 2, 1976

[30] Foreign Application Priority Data

Apr. 16, 1976 [GB] United Kingdom ............ 15642/75

[51] Int. Cl.² ............................................. C08F 240/00
[52] U.S. Cl. ........................................ 526/73; 526/290
[58] Field of Search ................... 526/76, 290, 73, 335

[56] References Cited

U.S. PATENT DOCUMENTS

| 3,709,854 | 1/1973 | Hepworth | 526/290 |
|---|---|---|---|
| 3,817,953 | 6/1974 | Younger | 526/76 |
| 3,865,797 | 2/1975 | Joy | 526/76 |

Primary Examiner—Paul R. Michl
Attorney, Agent, or Firm—Cushman, Darby & Cushman

[57] ABSTRACT

A synthetic resin is produced by polymerizing with a Friedel-Crafts catalyst a $C_5$ stream containing butadiene which has been preheated to a temperature of at least 160° C. for a period of up to 5 hours.

9 Claims, No Drawings

SYNTHETIC RESINS DERIVED FROM PETROLEUM

The present invention relates to synthetic resins derived from petroleum.

In British Pat. No. 1,360,389 we have described and claimed a process for the production of synthetic resins in which a feedstock comprising a $C_5$ stream as hereinafter defined, distilled from a cracked naphtha or gas oil and containing both mono-olefines and conjugated di-olefines is pretreated before conversion to the synthetic resin by heating to a temperature of at least 160° C. for a period of not more than five hours and is then polymerised by treatment with a Friedel Crafts catalyst.

The $C_5$ stream which is derived from a thermally or steam cracked naphtha or gas oil is said to boil in a typical range of 10° to 80° C. and to contain some or all of the following hydrocarbons:

isoprene, cis- and trans-piperylene, n-pentane, isopentane, pentene-1, cyclopentadiene, dicyclopentadiene, trans-pentene-2, 2-methylbutene-2, cyclopentene, cyclopentane and benzene.

In British Patent Application No. 45332/72 we have described and claimed a modification of the process of British Pat. No. 1,360,389 whereby a butene is added to the $C_5$ stream before or after the heat pretreatment. By this means the softening point of the resin produced may be varied at will and products obtained which are useful in formulating pressure sensitive adhesives.

We have now found that the properties of these adhesives are improved if butadiene is added to the $C_5$ stream before the heat pretreatment.

According to the invention, therefore, a process for the production of a synthetic resin comprises preheating to a temperature of at least 160° C. for a period of not more than 5 hours a $C_5$ stream as hereinafter defined which contains butadiene and then polymerising the stream by treatment with a Friedel Crafts catalyst.

The $C_5$ stream is derived from a thermally or steam cracked hydrocarbon such as naphtha or gas oil and typically boils in the range 10° to 80° C. It generally contains most of the following hydrocarbons:

isoprene, cis- and trans-piperylene, n-pentane, isopentane, pentene-1, cyclopentadiene, dicylopentadiene, trans-pentene-2, 2-methylbutene-1, 3-methylbutene-1, cyclopentane and benzene. If desired this $C_5$ stream may be further refined before being used in the process of the present invention, e.g. the isoprene may be removed by distillation.

The butadiene may be caused to be present in the $C_5$ stream by so conducting the distillation of the cracked hydrocarbon that a distillation fraction is taken containing both components. More usually, however, the butadiene is deliberately added to the $C_5$ stream either by itself or in conjunction with $C_4$ mono-olefines as in a $C_4$ fraction derived by distillation from a cracked hydrocarbon such as naphtha or gas oil. The amount of butadiene in the $C_5$ stream is suitably at least 0.5% by weight, preferably 1 to 50% by weight, more preferably 3 to 30% by weight.

The $C_5$ stream containing the butadiene is heated to a temperature of at least 160° C., preferably to a temperature in the range 160° to 230° C., more preferably 160° to 200° C., particularly 170° C., usually under its autogeneous pressure. As the reaction is exothermic the $C_5$ stream containing the butadiene may be heated to a lower temperature, e.g. 140° C. when the heat generated by the onset of the reaction will automatically raise the temperature of the stream to 160° C. and higher. The time of the preheat treatment is not more than 5 hours and is, for example, 0.05 to 3.5 hours when the temperature is about 170° C.

It is advantageous when carrying out the preheating process that following heating to a temperature of at least 160° C. the $C_5$ stream is then held at a temperature of between 100° and 160° C. for a further period of up to 5 hours. Preferably the time of the latter period is 0.05 to 1.5 hours and the temperature is between 120° and 150° C. The desired temperature may be achieved isothermally or adiabatic conditions may be applied, in which case the temperature may vary over a given period of time within the range specified. By carrying out this procedure any cyclopentadiene which is in monomeric form above 160° C. is caused to dimerise and thus exists as the dimer in the polymerisation feed. If the feed contains quantities of the monomer inferior resins tend to be produced.

We have found that particularly useful synthetic resins are obtained when a butene is added to the $C_5$ stream containing the butadiene either before or after the heat pretreatment.

The butene may be butene-1, butene-2, isobutene or mixtures of these butenes, particularly a mixture known as "butadiene raffinate" which is the residue remaining after the butadiene has been extracted from the $C_4$ stream distilled from a cracked hydro-carbon, e.g. a thermally or stream cracked naphtha or gas oil. A typical composition of such a raffinate is butene-1 (23 wt %), isobutene (45 wt %) trans-butene-2 (8 wt %), cis-butene-2 (7 wt %), butadiene (1 wt %), the balance being $C_4$ paraffins. Up to 50% of butene may be added based on the weight of the $C_5$ stream, preferably 10 to 50%.

When the $C_5$ stream containing butadiene has been subjected to the pretreatment in accordance with the present invention it is polymerised by means of a catalyst to produce a synthetic resin. Friedel Crafts catalyst are used, e.g. inorganic halides and inorganic strong acids. Inorganic halides are generally preferred and include halides of aluminum, iron, tin, boron, zinc, antimony and titanium which may be used in conjunction with a hydrogen halide such as hydrogen chloride. For example, treatment with aluminum chloride, preferably complexed with hydrogen chloride in an aromatic solvent such as toluene or a xylene produces a solution from which the resin may be recovered. Preferably, however, the Friedel Crafts catalyst is used in an aromatic solvent which is a hydrocarbon which is liquid at the temperature of the polymerisation and which is a substituted benzene comprising at least one secondary or tertiary alkyl group or cycloalkyl group, e.g. tert.butyl benzene, p-cymene, p-isobutyl toluene, p-ethyl-tert. amyl benzene or, in particular, cumene. Such catalysts are described in British Pat. No. 1,360,390 a complex of aluminium chloride, cumene and hydrogen chloride being preferred. The polymerisation of the $C_5$ feedstock is preferably carried out at a temperature of −100° C. to +150° C. under atmospheric pressure and the catalyst is finally broken down and removed from the polymer by treatment, for example with alcoholic ammonia or aqueous alkali or by extraction with an isopropanol/water mixture followed by one or more washes with water and, optionally, a steam distillation, to remove residual monomers.

The heat treatment at a temperature of at least 160° C. and/or the polymerisation of the feedstock may be carried out batchwise or continuously, preferably the latter.

The invention will now be further described with reference to the following Examples.

EXAMPLES

In the following Examples the $C_5$ stream used was derived from a steam cracked naphtha and contained isoprene, cis- and trans-piperylene, n-pentane iso-pentane, pentene-1, cyclopentadiene, dicyclopentadiene, trans-pentene-2, 2-methylbutene-2, cyclopentene, cyclopentane and benzene. In each Example the stream was first heated in a 1 liter autoclave at 170° C. for 3 hours. It was then held at 130° to 150° C. before being cooled prior to the polymerisation.

The polymerisation was carried out at ambient temperature by treating the feedstock with a catalyst complex produced by dissolving aluminium chloride in cumene while bubbling hydrogen chloride through the liquid. Sufficient complex was added to provide 0.8% by weight of aluminium chloride based on the weight of hydrocarbon feedstock. Catalyst addition took place over a ¼ hour period following which the catalyst was decomposed by the addition of aqueous isopropanol, the aluminium chloride being removed in the aqueous solution. The resin was finally water washed, dried, distilled to remove volatile impurities and steam distilled to remove heavy oils.

The following results in Table 1 were obtained in the preparation of a series of resins with differing amounts of butenes and butadiene.

TABLE 1

| Example | Amount of butadiene in $C_5$ stream Wt. % | Analysis of $C_5$ stream after the preheat (% by wt.)+ butadiene | $C_4$* | heteroadducts** | Resin Softening Point °C. | Resin yield based on weight of feedstock |
|---|---|---|---|---|---|---|
| 1 | 5 | 0.5 | 1.0 | 41.1 | 107 | 32% |
| 2 | 5 | 1.2 | 7.2 | 34.4 | 100 | 32% |
| 3 | 5 | 1.0 | 20.7 | 29.4 | 84 | 38% |
| 4 | 10 | 0.3 | 0.1 | 42.7 | 128 | 35% |
| 5 | 10 | 1.5 | 4.5 | 35.6 | 102 | 35% |
| 6 | 10 | 1.5 | 17.8 | 30.7 | 32 | 39% |
| 7 | 15 | 3.2 | 4.2 | 30.2 | 104 | 35% |
| 8 | 15 | 4.2 | 10.1 | 28.1 | 98 | 37% |
| 9 | 15 | 3.2 | 18.0 | 27.3 | 83 | 39% |

*the butenes were added as "butadiene raffinate" after the preheat treatment had taken place. The butadiene raffinate had the following composition:- butene-1 (23 wt.%), isobutene (45 wt.%), trans-butene-2 (8 wt.%), cis- butene-2 (7 wt.%), butadiene (1 wt.%), the balance being $C_4$ paraffins.
**Heteroadducts are codimers containing 8, 9 or 10 carbon atoms derived from butadiene and the other conjugated dienes, i.e. cyclopentadiene, isoprene and piperylene.
+The balance of the composition is made up of $C_5$ hydrocarbons.

The synthetic resins produced in Examples 1 to 9 were evaluated in a natural rubber and a synthetic rubber. The latter was "CARIFLEX" 1107 ("CARIFLEX" is a trademark) a styrene/isoprene block copolymer. The synthetic resins were blended with the rubbers by dissolving the rubber and resin in a paraffinic solvent (boiling range 80° to 100° C.) and determining the adhesive properties of the solution by the following standard test methods.

180° Peel Adhesion: Pressure Sensitive Tape Committee Test (US Standard) PSTC-No. 1. The test was carried out at a pulling rate of 12 inches/minute from stainless steel plates and measured in g. per linear inch.

Tack: Rolling Ball Method—PSTC-6. Method results reported in centimeters.

Quick Stick: In this method a loop of tape coated with the rubber/resin blend is held in the jaws of a tensile tester (INSTRON). The jaws of the tester are lowered until the tape falls under its own weight onto a stainless steel plate of 1 inch aquare cross section. The jaw movement is then reversed and a measurement made of the force required to peel the tape off the plate.

The results of the tests are given in the following Table 2.

TABLE 2

| NATURAL RUBBER (parts resin to one part rubber) | | | | | | | | | | | | | | | |
|---|---|---|---|---|---|---|---|---|---|---|---|---|---|---|---|
| | Tack (cms) | | | | | Peel (grams per inch) | | | | | Quick Stick (grams per in.) | | | | |
| Example | 0.2 | 0.6 | 0.8 | 1.2 | 1.6 | 0.2 | 0.6 | 0.8 | 1.2 | 1.6 | 0.2 | 0.6 | 0.8 | 1.2 | 1.6 |
| 1 | 2.8 | 1.8 | 1.4 | 8.2 | 40+ | 45 | 392 | 775 | 960 | 880 | 100 | 400 | 800 | 900 | 200 |
| 2 | 2.6 | 1.8 | 1.3 | 13.4 | 40+ | 36 | 420 | 490 | 950 | 1130 | 70 | 240 | 395 | 630 | 240 |
| 3 | 2.0 | 1.8 | 2.2 | 8.4 | 22 | 56 | 418 | 555 | 890 | 1510 | 75 | 200 | 500 | 690 | 1130 |
| 4 | 9.3 | 13.8 | 10.2 | 16.8 | 40+ | 31 | 265 | 435 | 450 | 545 | 52 | 170 | 200 | 285 | 190 |
| 5 | 3.6 | 2.1 | 5.0 | 20 | 40+ | 82 | 425 | 570 | 830 | 790 | 80 | 330 | 415 | 550 | 575 |
| 6 | 2.7 | 2.5 | 1.5 | 11.7 | 20.6 | — | — | — | 900 | 1310 | 97 | 350 | 580 | 960 | 1260 |
| 7 | 2.4 | 2.3 | 1.7 | 8.4 | 34.1 | 37 | 325 | 500 | 635 | 800 | 106 | 202 | 235 | 310 | 300 |
| 8 | 3.7 | 1.3 | 2.4 | 7.7 | 40 | 43 | 310 | 480 | 820 | 1200 | 55 | 240 | 445 | 670 | 910 |
| 9 | 2.7 | 1.0 | 1.8 | 4.4 | 13.5 | 23 | 255 | 370 | 700 | 1700 | 200 | 420 | 690 | 890 | 1000 |
| 10* | | | | | | | | | | | | | | | |
| 11** | | | | | | | | | | | | | | | |

| SYNTHETIC RUBBER (parts resin to one part rubber) | | | | | | | | | | | | | | | |
|---|---|---|---|---|---|---|---|---|---|---|---|---|---|---|---|
| | Tack (cms) | | | | | Peel (grams per inch) | | | | | Quick Stick (grams per inch) | | | | |
| Example | 0.2 | 0.6 | 0.8 | 1.2 | 1.6 | 0.2 | 0.6 | 0.8 | 1.2 | 1.6 | 0.2 | 0.6 | 0.8 | 1.2 | 1.6 |
| 1 | 1.9 | 6.9 | 11.8 | 40+ | 40+ | 9 | — | — | — | — | 15 | — | — | — | — |
| 2 | 2.1 | 4.6 | 14.6 | 40+ | 40+ | 31 | 210 | 890 | — | — | — | — | — | — | — |
| 3 | 18.2 | 3.6 | 26 | 40+ | 40+ | 17 | 400 | 960 | 1470 | 640 | 8.1 | 640 | 1000 | 112 | 70 |
| 4 | 3.9 | 8.7 | 24.2 | 40+ | 40+ | 950 | 820 | 720 | 610 | 580 | 100 | 590 | 1085 | 940 | 240 |

TABLE 2-continued

| | | | | | | | | | | | | | | | |
|---|---|---|---|---|---|---|---|---|---|---|---|---|---|---|---|
| 5 | 2.0 | 3.5 | 10.7 | 25 | 40+ | 920 | 1975 | 2600 | 2450 | 1725 | 540 | 1020 | 940 | 960 | 260 |
| 6 | 1.9 | 8.5 | 14.0 | 24 | 40+ | 125 | 700 | 1075 | 1400 | 1110 | 215 | 900 | 1480 | 2275 | 65 |
| 7 | 1.2 | 4.2 | 23.1 | 40 | 40+ | 560 | 1875 | 1275 | 1280 | 740 | 465 | 330 | 290 | 340 | 20 |
| 8 | 2.0 | 3.7 | 12.4 | 40+ | 40+ | 395 | 1220 | 1450 | 1370 | 240 | 240 | 960 | 1660 | 1420 | 120 |
| 9 | 1.8 | 4.1 | 10.9 | 40 | 40+ | 525 | 960 | 1140 | 1750 | 1850 | 730 | 2000 | 2450 | 2500 | 1000 |
| 10* | 2.7 | 1.1 | 0.7 | 3.7 | 7.0 | 79 | 44 | 595 | 1010 | 1300 | 130 | 445 | 640 | 690 | 960 |
| 11** | 1.8 | 4.5 | 6.5 | 27.5 | 40+ | 600 | 690 | 830 | 1630 | 1810 | 900 | 1500 | 1610 | 1680 | 1910 |

*The resin used in this comparative Example had a softening point of 82° C. and was made from a C5 stream containing 30 wt.% butenes but less than 0.5% butadiene.
**The resin used in this comparative Example had a softening point of 120° C. and was made from a C5 stream containing 15 wt.% butenes but less than 0.5% butadiene.

EXAMPLES 12 TO 17

The procedure described in Examples 1 to 9 was followed to make a further four resins but the process was scaled up by using a 50 liter instead of a 1 liter autoclave. The amount of catalyst used was increased to 1.2% aluminium chloride based on the weight of hydrocarbon feedstock and an attempt was made to control the reaction so as to obtain the optimum properties in the resin product. To this end the specific gravity of the solution was determined and this value used as an indication of when to terminate the reaction. In general, the softening point of the resin increases with increasing specific gravity of the solution except that a point is ultimately reacted when the softening point passes through a maximum and starts to fall again. The results from the resin preparation are given in Table 3.

TABLE 3

| Example | Amount of butadiene in C5 stream wt. % | Analysis of C5 stream after the preheat (% by wt.)+ | | | Specific Gravity of the Solution | Resin Softening Point °C. | Resin yield based on wt. of feedstock % |
|---|---|---|---|---|---|---|---|
| | | Butadiene | C4 | Heteroadducts** | | | |
| 12 | 10 | 0.6 | 0 | 34.6 | 0.090 | 148 | 32 |
| 13 | 10 | 0.6 | 14.4 | 32.3 | 0.084 | 71 | 26 |
| 14 | 10 | 0.6 | 14.4 | 32.3 | 0.096 | 88 | 30 |
| 15 | 10 | 0.6 | 14.4 | 32.3 | 0.115 | 115 | 36 |

*See Table 1.
**See Table 2.
+See Table 1.

The increased amount of catalyst used in Examples 12 to 17 increased the degree of conversion of the feedstock to resin as compared with Examples 1 to 16. The degree of conversion has a corresponding affect on the softening point of the resin and its adhesive properties. The synthetic resins were tested by the same tests as have been described in Examples 1 to 9 but in addition the shear properties of the formulations were determined by PSTC-2 which measures the amount of slip over a 24 hour period which takes place when a 1 kilo wt. is suspended by the adhesive tape from a standard surface. The results of these tests are given in Tables 4 and 5.

TABLE 4

NATURAL RUBBER (parts resin to 1 part rubber)

| | Tack (cms) | | | | | Peel (grams per inch) | | | | | Quick Stick+ (grams per in.) | | | | |
|---|---|---|---|---|---|---|---|---|---|---|---|---|---|---|---|
| Example | 0.2 | 0.6 | 0.8 | 1.2 | 1.6 | 0.2 | 0.6 | 0.8 | 1.2 | 1.6 | 0.2 | 0.6 | 0.8 | 1.2 | 1.6 |
| 12 | 3.5 | 3.3 | 5.5 | 13 | 40+ | 63 | 405 | 455 | 450 | 365 | 110 | 250 | 280 | 330 | 210 |
| 13 | 4.7 | 2.9 | 2.4 | 5.8 | 11.2 | 29 | 230 | 430 | 780 | 1120 | 70 | 180 | 320 | 650 | — |
| 14 | 2.4 | 0.4 | 1.7 | 5.2 | 16.5 | 47 | 345 | 510 | 1020 | 1220 | 160 | 220 | 320 | 670 | 510 |
| 15 | 3.7 | 2.2 | 4.7 | 17.3 | 40+ | 83 | 482 | 685 | 1130 | 1220 | 70 | 305 | 465 | 860 | 260 |
| 16* | 2.7 | 1.1 | 0.7 | 3.7 | 7.0 | 79 | 44 | 595 | 1010 | 1300 | 130 | 445 | 640 | 690 | 960 |
| 17** | 6.6 | 3.5 | 3.9 | 7.1 | 40+ | 131 | 690 | 850 | 1390 | 1360 | 128 | 600 | 665 | 1020 | 1010 |

SYNTHETIC RUBBER (Parts resin to 1 part rubber)

| | Tack (cms) | | | | | Peel (grams per inch) | | | | | Quick Stick+ (grams per inch) | | | | |
|---|---|---|---|---|---|---|---|---|---|---|---|---|---|---|---|
| Example | 0.2 | 0.6 | 0.8 | 1.2 | 1.6 | 0.2 | 0.6 | 0.8 | 1.2 | 1.6 | 0.2 | 0.6 | 0.8 | 1.2 | 1.6 |
| 12 | 4.6 | 12.2 | 35 | 40+ | 40+ | 800 | 710 | 500 | 250 | 200 | 395 | 400 | 8 | N/S | N/S |
| 13 | 0.7 | 0.7 | 2.1 | 14.3 | 40+ | 620 | 1600 | 1800 | 1650 | 1150 | 300 | 820 | 1160 | 1580 | 260 |
| 14 | 0.7 | 2.9 | 6.1 | 40 | 40+ | 880 | 1040 | 1360 | 800 | 460 | 500 | 570 | 460 | 280 | 20 |
| 15 | 3.7 | 6.9 | 16.5 | 40+ | 40+ | 740 | 1360 | 1520 | 250 | 70 | 850 | 1140 | 1000 | 100 | 0 |
| 16* | 1.8 | 4.5 | 6.5 | 27.5 | 40+ | 600 | 690 | 830 | 1630 | 1810 | 900 | 1500 | 1610 | 1680 | 1910 |
| 17** | 3.5 | 9.5 | 19.5 | 40+ | 40+ | — | 950 | 2100 | 1120 | 700 | 290 | 480 | 825 | 460 | — |

*The resin used in this comparative Example had a softening point of 85° C. and was made from a C5 stream containing 30 wt.% butenes but less than 0.5 wt.% butadiene.
**The resin used in this comparative Example was a commercially available polyterpene resin, softenin point 115° C.
+N/S = no slip.

TABLE 5

| | (Shear)+ | | | | |
|---|---|---|---|---|---|
| | NATURAL RUBBER (parts resin to 1 part rubber) | | | | |
| Example | 0.2 | 0.6 | 0.8 | 1.2 | 1.6 |
| 12 | N/S | N/S | N/S | N/S | N/S |
| 13 | N/S | 1.5m | 3.5m | — | 6.8 hr |
| 14 | N/S | 1.0m | 1. m | — | 24 hr |
| 15 | N/S | 0.5m | 0.2m | — | 2.5 hr |
| 16* | 2m | 7m | 16 hrs | 2 hrs | 0.4 hr |

TABLE 5-continued

| | (Shear)+ NATURAL RUBBER (parts resin to 1 part rubber) | | | | |
|---|---|---|---|---|---|
| Example | 0.2 | 0.6 | 0.8 | 1.2 | 1.6 |
| 17** | 1m | 2m | 5m | — | 8 hrs. |

+N/S = no slip
m = millimeter i.e. the degree of slip over the 24 hour period.
hr = time taken within the 24 hour period for the weight to pull the tape from the surface.

We claim:

1. A process for the production of a synthetic resin which comprises preheating to a temperature of at least 160° C. for a period of not more than 5 hours a $C_5$ stream boiling in the range 10° to 80° C. and which is derived from a thermally or steam cracked naphtha or gas oil and which contains 1 to 50% by weight butadiene and then polymerising the stream by treatment with a Friedel-Crafts catalyst.

2. A process according to claim 1 in which following the heating to a temperature of at least 160° C. the $C_5$ stream is then held at a temperature of between 100° and 160° C. for a further period of up to 5 hours.

3. A process according to claim 1 in which a butene is added to the $C_5$ stream containing the butadiene either before or after the heat pretreatment.

4. A process according to claim 1 in which the Friedel Crafts catalyst is a halide of aluminium, iron, tin, boron, zinc, antimony or titanium.

5. A process according to claim 1 in which the polymerisation is carried out at −100° C. to +150° C. under atmospheric pressure.

6. A process according to claim 1 in which the butadiene content of the $C_5$ stream is 3 to 30% by weight, the $C_5$ stream containing butadiene is heated to a temperature in the range 160° C. to 230° C. and the Friedel-Crafts catalyst is aluminium chloride complexed with hydrogen chloride in an aromatic solvent.

7. A process according to claim 6 in which following the heating to 160° to 230° C. the $C_5$ stream is then held at a temperature of 120° to 150° C. for 0.05 to 1.5 hours.

8. A process according to claim 6 in which up to 50% by weight of a mixture of butene-1, butene-2, and isobutene is added to the $C_5$ stream containing butadiene either before or after the heat pretreatment.

9. A process according to claim 6 in which the aromatic solvent is toluene, a xylene or a hydrocarbon which is liquid at the temperature of the polymerisation and which is a substituted benzene comprising at least one secondary or tertiary alkyl group or cycloalkyl group.

* * * * *